(12) United States Patent
Michael et al.

(10) Patent No.: US 7,653,794 B2
(45) Date of Patent: Jan. 26, 2010

(54) CONVERTING PHYSICAL MACHINES TO VIRTUAL MACHINES

(75) Inventors: Michael L. Michael, Redmond, WA (US); William L. Scheidel, Sammamish, WA (US); Benjamin Alan Leis, Seattle, WA (US); Karan Mehra, Sammamish, WA (US); Venkatasubrahmanyam Raman, Seattle, WA (US); Natalia Varava, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 11/430,676

(22) Filed: May 8, 2006

(65) Prior Publication Data

US 2007/0260831 A1 Nov. 8, 2007

(51) Int. Cl.
*G06F 13/00* (2006.01)
(52) U.S. Cl. ...................... 711/162; 707/204
(58) Field of Classification Search .................. 711/162; 707/204
See application file for complete search history.

(56) References Cited

U.S. PATENT DOCUMENTS

| | | | |
|---|---|---|---|
| 4,475,156 A | 10/1984 | Federico et al. | |
| 4,787,026 A | 11/1988 | Barnes et al. | |
| 4,835,685 A | 5/1989 | Kun | |
| 4,975,836 A | 12/1990 | Hirosawa et al. | |
| 5,692,193 A | 11/1997 | Jagannathan et al. | |
| 5,996,026 A | 11/1999 | Onodera et al. | |
| 6,052,781 A | 4/2000 | Weber | |
| 6,256,637 B1 | 7/2001 | Venkatest et al. | |
| 6,397,242 B1 | 5/2002 | Devine et al. | |
| 6,445,704 B1 | 9/2002 | Howes et al. | |
| 6,496,847 B1 | 12/2002 | Bugnion et al. | |
| 6,789,156 B1 | 9/2004 | Waldspurger | |
| 6,880,002 B2 | 4/2005 | Hirschfeld et al. | |
| 7,356,679 B1* | 4/2008 | Le et al. ........................ | 713/1 |
| 7,447,857 B2* | 11/2008 | Lyon ........................... | 711/162 |
| 7,448,034 B2* | 11/2008 | Anderson et al. ........... | 717/176 |
| 2005/0289540 A1 | 12/2005 | Nguyen et al. | |

OTHER PUBLICATIONS

Microsoft Computer Dictionary, 5th Edition, Microsoft Press, 2002, definition of "boot record".*
A Case For Grid Computing On Virtual Machines, by Renato J. Figueiredo, Peter A. Dinda and José A.B. Fortes [online] [retrieved on Jan. 3, 2006]. Retreived from the Internet URL: http://www.usenix.org/events/usenix01/sugerman.html.

(Continued)

*Primary Examiner*—Sheng-Jen Tsai
*Assistant Examiner*—John P Fishburn
(74) *Attorney, Agent, or Firm*—Woodcock Washburn LLP (57) ABSTRACT

Physical (or prior virtual) machine volumes can be converted to virtual machines at a virtual machine host while the physical machines are running. In one implementation, a volume shadow copy service can be used to create an application (and/or file system)-consistent snapshot of one or more physical machine volumes while the one or more volumes are running. The snapshot data can then be transferred to a mounted virtual hard disk file (dynamic or fixed) at a virtual machine host. Operational information (e.g., boot record, system registry, drivers, devices, configuration preferences, etc.) associated with the virtual hard disk file and the operating system(s) within the virtual machine can then be modified as appropriate to ensure that the corresponding virtual machine is bootable and functional at the virtual machine host. The virtual hard disk file can then be un-mounted, and used as a new virtual machine.

20 Claims, 3 Drawing Sheets

OTHER PUBLICATIONS

Harness: A Next Generation Distributed Virtual Machine, by Micah Beck, Jack J. Dongarra, Graham E. Fagg, G. Al Geist, Paul Gray, James Kohl, Mauro Migliardi, Keith Moore, Terry Moore, Philip Papadopoulous, Stephen L. Scott and Vaidy Sunderam, dated Jun. 24, 1998 [online] [retrieved on Jan. 3, 2006]. Retrieved from the Internet URL: http://phase.hpcc.jp/mirros/netlib/utk/people/JackDongarra/PAPERS/harness2.ps.

Terra: A Virtual Machine-Based Platform for Trusted Computing, by Tal Garfinkel, Ben Pfaff, Jim Chow, Mendel Rosenblum and Dan Boneh [online] [retrieved on Jan. 3, 2006]. Retrieved from the Internet URL: http://athos.rutgers.edu/~tdnguyen/courses/cs545/spring2004/papers/sosp-2003-garfinkel-terra.pdf.

VMware, Inc.: Virtualizing I/O Devices on VMware Workstation's Hosted Virtual Machine Monitor, by Jeremy Sugerman, Ganesh Venkitachalam and Beng-Hong Lim [online] [retrieved on Jan. 3, 2006]. Retrieved from the Internet URL: http://www.usenix.org/events/usenix01/sugerman.html.

Workstation 5, Powerful Virtual Machine Software for the Technical Professional User's Manual, VMare Inc., http//www.vmware.com/pdf/ws5_manual.pdf, 2005, pp. 101-276.

\* cited by examiner

CONVERTING PHYSICAL MACHINES TO VIRTUAL MACHINES

CROSS-REFERENCE TO RELATED APPLICATIONS

N/A

BACKGROUND

Background and Relevant Art

There are a number of ways to distribute different types of resources (software, hardware, or combinations thereof) in a computerized environment. From a software standpoint, for example, an enterprise might install multiple copies of an operating system (or application program) on multiple different computers, and thereby distribute one copy among many systems. Conventional ways of sharing hardware include setting up computer systems on a network so that multiple different computer systems can access another computer's drive space for various storage or file sharing needs.

Recent advances in hardware capabilities (i.e., the present storage, memory, and processing capacities), however, has meant that simply providing conventional storage and/or network traffic management functions tends to underutilize a given physical machine. As such, additional ways of distributing resources from a combined software and hardware standpoint now include installing multiple virtual computer systems on a single physical system. Generally, virtual machines can be installed with a unique instance of a particular operating system on a dedicated portion of a host's storage, and with an allocated portion of host memory and processing power.

Because of these and other features, virtual machines can be easily distinguished from other virtual machines, and even from the host server on which they are installed. To other users on the network, the virtual machine would simply appear as a separately addressable computer system, such as any other physical computer system on the network. The virtual machines could then be used for a wide range of purposes, such as to be used as another server (e.g., e-mail or database server) on a network, for software or hardware testing purposes, as the main computer system for a thin client, and so forth.

In addition to this functionality, virtual machines can also provide the added benefit of being able to be installed and set up—as well as removed—fairly easily and in some cases rapidly. For example, an administrator for a particular host computer system can receive a request for a virtual machine, manually allocate appropriate resources on the host computer, and then install the requested virtual machine. When the virtual machine is no longer needed, the administrator can manually select one or more commands to shut down or even delete the virtual machine at the host server. Accordingly, an organization may desire to reduce its number of physical machines (servers, personal computers, etc.) by having one or few host servers potentially host hundreds of virtual machines. One will appreciate that such consolidation can provide a number of advantages, especially if the organization can reduce various resource consumption and machine management costs, including power savings, temperature/cooling savings, space savings, and other savings available due to reduced physical machine utilizations.

Unfortunately, it is not a simple matter to consolidate physical machines by converting a select number of existing physical computer systems to virtual machines. In particular, simply copying the contents of a physical drive onto a host server's partition would generally not be enough to create a usable virtual machine. For example, performing a basic copy of a physical machine's drives, while the physical machine is running could create inconsistencies in file state (i.e., the data are not "application-consistent"). As such, applications that are accessing data at the physical machine may be unable to use copies of the data when later moved to a virtual machine. In addition, simply transferring such a copy to a host server could result in other inconsistencies in the system registry, or inconsistencies with various disk and network drivers, inconsistencies in the operating system binaries, and so forth. Although there exist some mechanisms for getting around such difficulties, conventional mechanisms for doing so typically involve significant downtime and resource expenditures (both from human and software perspectives).

For example, one method of converting a physical machine involves creating a virtual machine at a virtual machine host from scratch. In particular, an administrator can simply install all applications at the physical machine in the new virtual machine, transfer file system and application data to the virtual machine, and then rebuild any other workload at the virtual machine from scratch, and/or through application restore operations. Of course, this method is undesirable from a variety of perspectives, and can create a drain on an organization's resources, particularly if attempting to convert hundreds of physical machines into virtual machines.

Another method for converting a physical machine involves use of fairly complicated infrastructure components, such as Automated Deployment Services ("ADS"), and/or Pre-Installation Executable Environment ("PXE") to create a transferable copy of a physical machine's contents. Generally, mechanisms using this type of infrastructure include shutting down the physical machine, and rebooting the physical machine with, for example, a PXE. This allows the administrator to start the physical machine without loading the innate operating system, and therefore forbid writes to files during copy processes.

After copying the physical drive contents, the administrator can then transfer the contents to a virtual machine host. This alone can take one or more hours for gigabytes of data. Upon transferring the data, the administrator will then need to perform a number of relatively complicated changes to the transferred data to make the copied contents bootable as a virtual machine. At least in part due to the downtime associated with taking the physical machine that is being converted offline and making the data bootable, this method is typically done when simply rebuilding the physical machine from scratch as a virtual machine is too difficult.

Accordingly, there are a number of issues associated with converting physical machines to virtual machines that can be addressed.

BRIEF SUMMARY

Implementations of the present invention solve one or more problems in the art with systems, methods, and computer program products configured to efficiently convert physical machines to virtual machines. In particular, implementations of the present invention allow physical machine volume data to be quickly copied, transferred, and made bootable, such as at a virtual machine host (or other appropriate computer system), without necessarily having to take the physical machine offline. In one implementation, for example, one or more application writers (e.g., via a volume shadow copy service) can be used to create an application (and/or file system)-consistent snapshot of one or more physical machine volumes while the one or more volumes remain online. The snapshot(s) can then be transferred using efficient transferring means (e.g., block level copy) to a virtual hard disk file at a host server. Operational information (e.g., boot data, system registries and binaries, etc.) associated with the transferred snapshot data can then be modified at the virtual machine host to thereby make the transferred snapshot volumes bootable.

For example, one example method in accordance with an implementation of the present invention from the perspective of a physical machine of converting a physical machine to a virtual machine without incurring significant downtime can involve identifying one or more hardware configuration settings for one or more volumes of a physical machine. The method can also involve creating one or more consistent snapshots corresponding to the one or more physical machine volumes. In addition, the method can involve sending the one or more snapshots to a mounted virtual hard disk file. Furthermore, the method can involve sending a boot record for the one or more consistent snapshots to the mounted virtual hard disk file. In such a case, the boot record can form part of the operational information for the one or more consistent snapshots that can be modified (or created from scratch, as necessary) at the virtual machine host.

In addition, another example method in accordance with an implementation of the present invention from the perspective of a virtual machine host of converting a physical machine to a virtual machine can involve creating a virtual hard disk file having a file size. The method can also involve mounting the virtual hard disk file at a virtual machine host. In such a case, the virtual hard disk file can appear as an accessible physical disk to an operating system. In addition, the method can involve receiving one or more consistent snapshots corresponding to one or more physical machine volumes. Furthermore, the method can involve modifying operational information for the one or more consistent snapshots. As such, the one or more consistent snapshots can be made appropriate for an operating system at the virtual machine host, such as through changes to boot records, drivers, operating system binaries, system registries, and/or configuration preferences. Still further, the method can involve removing the mount of the virtual hard disk file. The virtual hard disk file can therefore be inaccessible as a physical disk, but, rather, bootable as a virtual machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to systems, methods, and computer program products configured to efficiently convert physical machines to virtual machines. In particular, implementations of the present invention allow physical machine volume data to be quickly copied, transferred, and made bootable, such as at a virtual machine host (or other appropriate computer system), without necessarily having to take the physical machine offline. In one implementation, for example, one or more application writers (e.g., via a volume shadow copy service) can be used to create an application (and/or file system)-consistent snapshot of one or more physical machine volumes while the one or more volumes remain online. The snapshot(s) can then be transferred using efficient transferring means (e.g., block level copy) to a virtual hard disk file at a host server. Operational information (e.g., boot data, system registries and binaries, etc.) associated with the transferred snapshot data can then be modified at the virtual machine host to thereby make the transferred snapshot volumes bootable.

Accordingly, implementations of the present invention can provide such advantages as relatively fast, "one-touch" physical-to-virtual machine conversion in a manner that can avoid physical machine downtime. Furthermore, implementations of the present invention allow for a reliable "one-touch" physical-to-virtual machine conversion since the converted machine will be consistent at the virtual machine host. As will be understood more fully from the following specification and claims, such conversions can be accomplished with any number of suitable components and modules. For example, implementations of the present invention can include use of components and mechanisms in a Volume Shadow Copy Service ("VSS") to create application (and/or file system)-consistent snapshots. Such components can create one or more consistent snapshots (or point-in-time images) of one or more physical machine volumes that are running during snapshot processes.

In addition, implementations of the present invention can include use of a Volume Disk Service ("VDS") and/or related components. In general, a VDS (or related component(s)) includes platforms for creating and configuring volumes on physical disks. Furthermore, implementations of the present invention include use of a "disk imager," and, in some cases, use of an "image mounter." Generally, a disk imager includes components and/or modules configured to create a block (or byte block)-based copy of a physical disk or volume given a starting location and number of bytes (or byte blocks) to copy. By contrast, an image mounter tool comprises one or more components and/or modules configured to take, for example, a virtual hard disk file as input, and mount the virtual hard disk file in the file system to expose the file as a physical disk. This exposed physical disk can be made accessible just like any other physical disk might be accessible to an operating system, which includes the capability of having data written to its volume(s).

Implementations of the present invention further include use of a virtual hard disk file ("VHD" file) at a virtual machine host, where the VHD file comprises one physical disk and one or more physical disk volumes managed by (and accessible inside) one or more Virtual Machines ("VMs"). Although the terms "virtual machine," "virtual machine host," and "VHD file" are used in some MICROSOFT environments, one will appreciate that reference herein to MICROSOFT components (and/or WINDOWS SERVER components) is exemplary only. In particular, one will appreciate after reading this specification and claims that the components, modules, and/or mechanisms described herein can be found and practiced in a wide range of operating environments that implement virtual machines or related such entities.

Figure 1A:
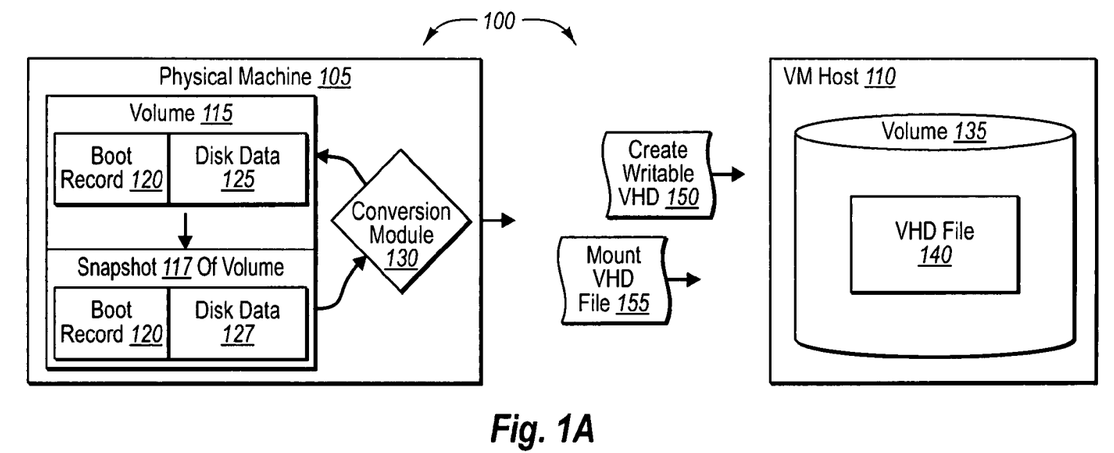
FIG. 1A illustrates an overview schematic diagram in accordance with an implementation of the present invention in which one or more snapshots are taken of one or more physical disk volume(s), and one or more virtual hard disk files are created at a virtual machine host.

Referring now to FIG. 1A, the figure illustrates a schematic overview diagram of an exemplary computerized environment 100 in which physical machine 105 (e.g., a personal computer, a physical server, etc.) can be converted to a virtual machine hosted at a virtual machine host 110. At one elemental level, converting a physical machine (e.g., 105) to a virtual machine (e.g., 175, FIG. 1C) can involve taking a snapshot of the one or more physical machine volume(s) (e.g., 115), creating a virtual machine hard disk file(s) (e.g., 140) at a virtual machine host, transferring the snapshot(s) into the VHD file, and then making one or more of the transferred snapshot volume(s) in the VHD file bootable as a virtual machine (e.g., 175). Thus, one can appreciate that there are a number of different preparation and post-operation processes that can be implemented in order to make the conversion occur efficiently.

In at least one implementation, for example, the conversion process can be initiated through use of conversion module 130 (i.e., which can include one or more modules at machine 105 and/or host 110), which initiates snapshot operations of one or more volumes on the physical disk(s) of physical machine 105 (e.g., volume 115). In general, conversion module 130 can comprise any appropriate writers and requesters configured for creating a consistent shadow copy of a physical disk volume. As previously mentioned, for example, such writers and requestors can be provided in a volume shadow copy service. Thus, for example, conversion module 130 can begin the conversion process by sending a signal to all application writers in each one or more volume of a physical disk (e.g., volume 115) to begin snapshot operations of its data. As shown, for example, volume 115 includes at least volume data 125, as well as boot record 120.

Upon receiving this message from conversion module 130, each application writer on volume 115 might flush its in-memory data to physical disk, and/or freeze any file system or volume logs. For applications that do not use an application writer, conversion module 130 can instruct (e.g., by default, or by command from a user or administrator) to shut the application down, and thereby ensure no writes are made during the snapshot. Accordingly, FIG. 1A shows that conversion module 130 can then create a single, point-in-time snapshot (i.e., copy) of all volume data on volume 115. For example, FIG. 1A shows that conversion module 130 has created a snapshot 117 of volume 115 (i.e., the "snapshot volume"), where snapshot 117 in this case comprises volume data 127 and boot record 120.

One will appreciate that a number of optimizations that can be performed when taking the snapshot, or performing snapshot (and copy) operations, to ensure data are copied and transferred in efficient ways. For example, conversion module 130 can identify what portions of volume 115 are being used (i.e., include data) and what portions are free. Snapshot operations can thus be configured only to copy the used portions of the volume(s) or physical disk, rather than the entire volume(s) or entire physical disk. In addition, snapshot operations can further be configured to avoid certain files that might be less useful (or not useful at all) in a virtualized environment.

In particular, for example, snapshot operations may be further configured to identify such files as those included in a volume diff area, page files, bad clusters, hibernation files, and so forth. These files can thus be avoided when creating snapshot 117 or performing the byte block transfer, and further reduce the amount of data that need to be transferred to virtual machine host 110. One will appreciate these types of files and optimizations can be readily varied for other types of files, used or free space calculations, and the like in a wide variety of operating environments.

In any event, and by way of explanation, data 127 in snapshot 117 will generally differ from the original data 125 on volume 115 primarily due to changes in time during (and/or after) snapshot operations. For example, since physical machine 105 is still running during snapshot operations, volume data 125 can continue to change, such as if a user is continuing to create writes to certain application data. Thus, volume data 127 (i.e., "volume data 127") represent an earlier consistent, point-in-time of the data 125 on volume 115, which is essentially the point-in-time at which conversion module 130 initiated snapshot processes.

Nevertheless, FIG. 1A also shows that boot record 120 is the same on snapshot 117 as it is with the running data of volume 115. That is, one will appreciate that boot records (e.g., 120) are unlikely to change during the snapshot processes since applications typically do not have access to the boot record. In particular, boot records are generally changed by the operating system, and typically on an infrequent basis, if at all. As such, FIG. 1A shows that boot record 120 in this case is the same as it was as before snapshot operations.

Prior to, during, or shortly after creating snapshot 117, conversion module 130 can also set up one or more virtual hard disk ("VHD") files 140 at virtual machine host 110 that corresponds to the physical machine 150 physical disk (not shown). For example, FIG. 1A shows that conversion module 130 sends message 150 to create writeable virtual hard disk file 140. In one implementation, this can also include sending a message first to create a VHD file(s) (e.g., 140) of a particular fixed size, and then sending a separate message to make the VHD file writable. (Conversion module 130 can also send a message to create (writable or otherwise) a dynamically-sized VHD file, which grows in size with added data.)

Generally, each VHD file can be configured to correspond to a single physical disk of a computer system, and each volume within a physical disk can be represented in kind in the newly created VHD file. A VHD file, however, may in some cases represent a single volume, rather than an entire physical disk. Nevertheless, in the physical disk example where a physical disk has multiple volumes (though only single volume 115 is shown), the new VHD can also contain data corresponding to multiple volumes. There is, of course, some flexibility in this regard. For example, if a user of physical machine 105 had a volume spreading across multiple partitions (and/or mirrored volumes, etc.), the user might decide to dedicate only one partition to the snapshot data in the destination virtual hard disk file. Similarly, the user might decide only to transfer one volume of a physical disk comprising multiple volumes to a virtual hard disk file.

Thus, the size of the VHD file will generally be a size that is at least as large as may be needed with respect to the transferred source (e.g., physical disk, specifically physical disk volume, data within the physical disk, etc.) data. As such, one will appreciate that the techniques herein can also be further used when duplicating an existing virtual machine into a larger storage space. For example, an administrator, upon identifying that a virtual machine's volume storage capacities are diminishing, can create additional, larger VHD file(s), snapshot the virtual machine data, and essentially "re-virtualize" the virtual machine by transferring (e.g., copying) its snapshot data into the new VHD file(s) using the same processes already described.

Thus, implementations of the present invention include not only "physical to virtual" machine conversions, but also "virtual to virtual" machine conversions. In particular, and in some circumstances, implementations of the present invention can also be more generally referred to as converting a "machine" to a "virtual machine." That is, a "machine" can be understood to include both "physical" computer systems (e.g., a desktop computer with associated hardware and operating system(s)) and "virtual" computer systems (e.g., a computer system installed at a virtual machine host as a unique computer system(s)).

In any event, upon creating virtual hard disk file 140, conversion module 130 will mount the file 140 as a physical disk, so that file 140 can receive the data of snapshot 117 through, for example, network communication. (One will appreciate that, in some implementations described herein, mounting may not even be required.) Thus, FIG. 1A also shows that conversion module 130 sends message 155 to mount virtual hard disk file 140. In additional or alternative implementations, message 155 can include an instruction to mount VHD file 140 on any of virtual machine host 110, on the physical machine 105 being converted, or anywhere where there is network connectivity between the machine where VHD file 140 is mounted and the physical machine being converted (i.e., 105 in this case).

Figure 1B:
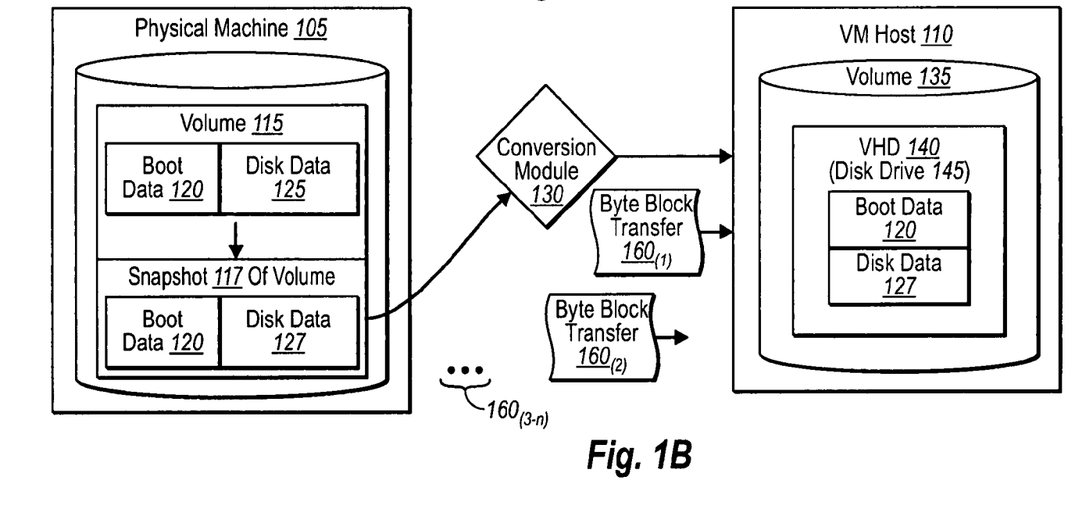
FIG. 1B illustrates the overview schematic diagram of FIG. 1A, in which the data of the one or more snapshots of the physical disk volume(s) are transferred into the created virtual hard disk file using efficient transfer mechanisms.

Part of mounting file 140 can include associating the file with one or more device identifiers, such as the device ID of a physical disk. For example, virtual machine host 110 could be instructed to mount virtual hard disk file 140 so that it is identifiable through a drive path as "\\.\device\Harddisk145\." In particular, FIG. 1B shows that VHD 140 is identifiable as "disk drive 145." Along similar lines, conversion module 130 can also identify a device identifier (and/or mount points, for example) for each snapshot (e.g., 117). Ultimately, conversion module 130 can use the identified device identifiers for any snapshot and for any corresponding VHD files to transfer snapshot contents.

Generally, conversion module 130 can transfer the snapshot 117 contents using any number of data transfer mechanisms. In one implementation, for example, conversion module 130 can transfer snapshot 117 on a byte-by-byte basis into file 140 through disk drive 145. In additional or alternative implementations, however, conversion module 130 can transfer snapshot 117 to file 140 by identifying and transferring "byte blocks." In general, byte blocks comprise a fixed sequence (of any arbitrary size) of individual bytes. In at least one implementation, transferring byte blocks, rather than individual bytes, can dramatically increase the speed by which snapshot 117 can be transferred over a network.

For example, several gigabytes of data that might ordinarily take several hours to transfer to virtual machine host 110 over conventional network transfer protocols can be transferred in some cases in just a few minutes with byte block transfer mechanisms. In any event, FIG. 1B shows that conversion module 130 transfers in this case bytes (or byte blocks) "$160_1$," "$160_2$," etc., and transfers these bytes/byte blocks directly into the writable virtual hard disk file 140 through disk drive 145. As shown in FIG. 1B, virtual hard disk file 140 can have all of the boot data 120, and will include other volume data 127 captured in snapshot 117, upon completion of the data transfer.

Despite the data transfer, the virtual hard disk file 140 may not necessarily be bootable at virtual machine host 110, since the boot data and drivers are unlikely to be useful in the context of virtual machine host 110. One reason for this is that the "virtual hardware" that exists in the virtual machine environment (and/or within virtual machine host 110) might not be the same as the hardware for physical machine 105. For example, such components as the kernel and the Hardware Abstraction Layer ("HAL") on physical machine 105 may be based, for example, on a dual processor system. In addition, virtual machine host 110 can emulate different network card drivers, processor architecture, physical disks (e.g., storage attached to the machine), physical disk identifiers, operating system drivers, and disk drivers to the hosted virtual machines, which might not otherwise be found at the source machine being converted (e.g., physical machine 105). Such differences are also likely to exist when converting a physical disk volume from within the virtual host to a virtual machine.

As a result, transferred boot data 120 might be based on operating system characteristics at physical machine 105 that do not necessarily apply within the appropriate virtualized environment at virtual machine host 110. These and other reasons mean that an administrator may need to make a number of different modifications, depending on the particular operating environment(s). Accordingly, conversion module 130 can also modify virtual hard disk file 140 to be bootable at virtual machine host 110. This can include, in some cases, instructions to update the kernel and HAL—and other drivers and registry settings—for the virtual machine to be created, based on the snapshot data.

Figure 1C:
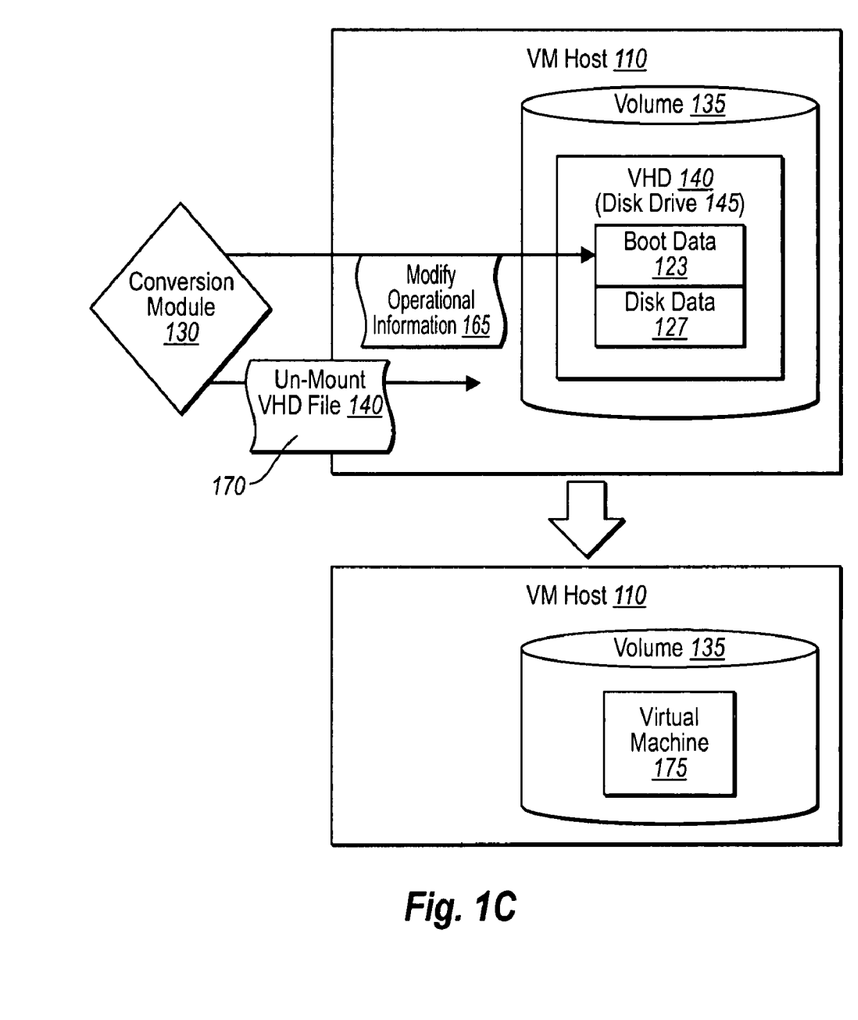
FIG. 1C illustrates the overview schematic diagrams of FIGS. 1A-1B, in which virtual hard disk file containing the transferred snapshot data is modified to create a bootable virtual machine in accordance with an implementation of the present invention.

Thus, for example, FIG. 1C shows that conversion module 130 also sends request 165 and corresponding arguments to virtual machine host 110 to modify operational information. (In some cases, these modifications to the operational information of the virtual machine (e.g., boot sector and the registry information) can even be done at the physical machine (before being transferred inside a VHD file.)) In one implementation, this can include conversion module 130 examining the boot record of volume snapshot 117, and replacing previously transferred boot data 120 with new boot information (e.g., modified boot information, or new boot information from scratch) based on the new disk and volume configuration of the virtual machine. In another step, conversion module 130 can also examine the transferred registry information (not shown) of volume snapshot 117, and update the transferred registry information in a manner appropriate for the virtual machine 110, based on the new hardware and drivers that exist on virtual machine host 110.

Such updating can also include changing the system binaries, such as the kernel and HAL drivers, from multi-processor to a single processor hardware configuration. In addition, such updating can include adding computer and drive identity information unique to virtual machine host 110, adding any appropriate disk or file drivers unique to virtual machine host 110, as well as changing the registry information to accommodate the appropriate network drivers, storage drivers, and so forth. Such updating can further include replacing drivers for physical devices with drivers for virtual devices, disabling drivers for hardware where there is no corresponding virtual device in the virtual environment, and disabling services and applications that depend on devices where there is no corresponding virtual device in the virtual environment.

In addition, conversion module 130 can further create these and/or other appropriate configuration values for the intended virtual machine (e.g., 175), such that the resulting virtual machine (e.g., 175) will operate with the same preferences (e.g., memory, CPU, etc.) as at the original physical machine 105. Along these lines, an administrator of the virtual machine host 110 may also (or alternatively) modify these preferences for the resulting virtual machine. Furthermore, the administrator may even build such operational information (i.e., configuration values, preferences, etc.) from scratch. In either case, one will appreciate that a number of entities can make any number of configuration changes appropriate to ensure the resulting virtual machine is bootable, and will operate correctly on the virtual machine residence (e.g., virtual machine host 110).

After appropriately modifying/creating the appropriate boot record (i.e., from 120 to 123), system registry information, driver information, and/or other configuration or preference information, conversion module 130 can then remove the mount of (i.e., "un-mount") virtual hard disk file 140, so that it is no longer accessible as a drive. For example, FIG. 1C shows that conversion module 130 sends message 170 to virtual machine host 110, instructing virtual machine host 110 to remove the mount of virtual hard disk file 140. After removing this mount, virtual hard disk file(s) 140 can be used as virtual machine 175, whose data is essentially identical to the data of volume 115 at the point snapshot operations were commenced.

In particular, the data within the volume(s) managed by new virtual machine 175 are consistent in every appropriate respect (e.g., application-consistent, file system-consistent, and/or crash-consistent, etc.) As a result, a prior user of physical machine 105 will now be able to boot virtual machine 175 at virtual machine host 110 and use the virtual machine (including accessing prior data) just as though (or more optimally than if) the user were using physical machine 105. In addition, one will appreciate that the VHD files can be generally portable. For example, the end-user can transfer virtual machine 175 to any location desired (i.e., another virtual machine host) in at least one implementation simply by transferring the virtual machine file(s) (e.g., VHD file(s), etc.) associated with virtual machine 175 to the desired location and performing any necessary operational information updates.

In another implementation, the one or more VHD files (e.g., 140) can even be created at physical machine 105 itself, and then sent/transferred to the appropriate virtual machine host (e.g., 110). For example, a user at physical machine 105 can create a VHD file (e.g., 140) at the physical machine, and transfer the snapshot a contents into the VHD file for the data of interest at the physical machine. This is at least one way that the user can avoid mounting the VHD file (i.e., at virtual machine host 110), if desired. In either case, the user can then send/transfer the VHD file and corresponding snapshot contents to an appropriate destination (e.g., virtual machine host 110), and change corresponding operational information at the destination. Alternatively, the user may even change operational information for the VHD file and snapshot contents at the source (e.g., physical machine 105) before sending the VHD file and snapshot contents onward to the new destination.

In some cases, rather than create a VHD "file," as such, a module (e.g., conversion module 130) could be configured to stream from memory the snapshot data and VHD metadata created at physical machine 105 in portions (e.g., byte block) effective for transportation. The data to be streamed can also be formatted in a VHD format according to appropriate VHD format/content specifications. Thus, after being transferred to the destination (e.g., virtual machine host 110), the stream can then be saved as a VHD file, since the streamed data was generated in VHD format. This is yet another way to avoid mounting the VHD file.

Figure 2:
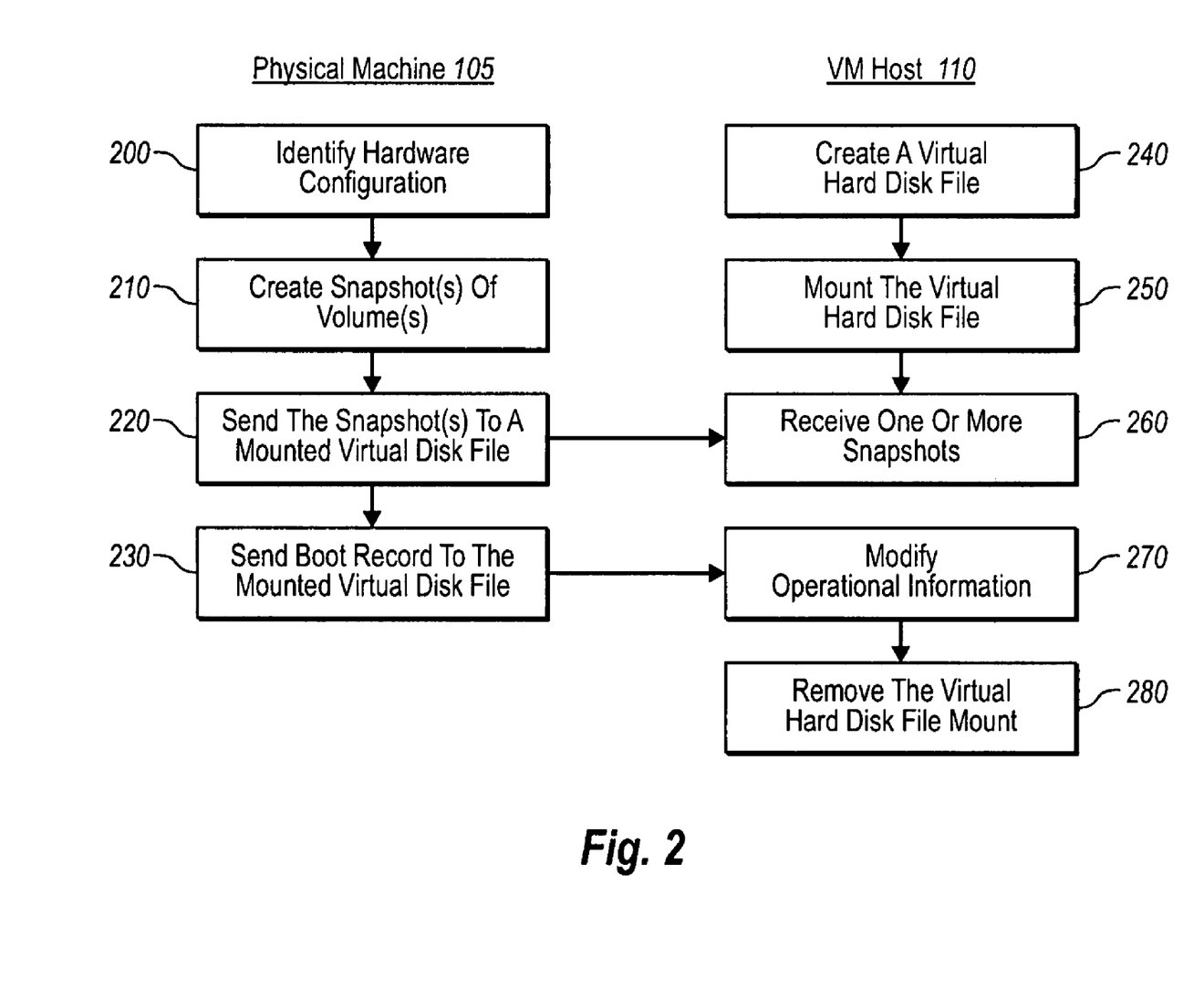
FIG. 2 illustrates flowcharts of methods from the perspective of a physical (machine and of a virtual machine host for converting one or more machines into corresponding one or more virtual machines.

Accordingly, FIGS. 1A-1C illustrate a number of overview schematics and components that can be used in accordance with implementations of the present invention for creating a snapshot of physical machine volume data and creating a new virtual machine from that data. In addition to the foregoing, implementations of the present invention can also be described in terms of flow charts of methods comprising one or more acts for accomplishing a particular result. For example, FIG. 2 illustrates flowcharts of methods from the perspective of physical machine 105 and of virtual machine host 110 for converting a machine, such as a physical machine or a different virtual machine, to a virtual machine. The methods of FIG. 2 are described below with respect to the components in mechanisms in FIGS. 1A through 1C.

For example, FIG. 2 shows that a method from the perspective of physical machine 105 of converting a physical machine to a virtual machine at a virtual machine host without incurring significant down time on the one or more physical machine volumes can comprise an act 200 of identifying hardware configurations of the physical machine. Act 200 includes identifying one or more hardware configuration settings for one or more volumes of a machine. For example, FIG. 1A shows conversion module 130, which can identify hardware (and/or software) configuration settings on volume 115 prior to initiating the snapshot processes. This can include identifying the boot record 120 and volume data 125 as they exist at physical machine 105 on volume 115, and can further include identifying whether the data are configured for a multi-processor environment, incompatibilities in operating system supported files, whether there are storage and network drivers that need to be considered, and so forth.

In addition, FIG. 2 shows that the method from the perspective of physical machine 105 can comprise an act 210 of creating a snapshot of the one or more volumes. Act 210 includes creating one or more consistent snapshots corresponding to the one or more machine volumes. For example, FIG. 1A shows that conversion module 130 creates snapshot 117 of volume 115, which includes the same boot record 120 as before, as well as volume data 127. In at least one implementation, conversion module 130 can invoke writer-involved snapshot processes on volume 115 where available, or simply shut down applications (or other write processes) where such writers are not available. As a result, data within snapshot 117 can be ensured to be consistent (e.g., application consistent) for a single instance in time after the snapshot processes.

FIG. 2 also shows that the method from the perspective of physical machine 105 can comprise an act 220 of sending the snapshot(s) to a mounted virtual disk file. Act 220 includes sending the one or more consistent snapshots to a mounted virtual hard disk file. For example, conversion module 130 retrieves device identifiers for each snapshot taken at physical machine 105, and further retrieves any device identifiers for each virtual hard disk file mounted at virtual machine host 110. Upon retrieving appropriate device identifiers, FIG. 1B shows that conversion module 130 can transfer volume data 127 of snapshot 117 into virtual hard disk file 140, such as using byte (or byte block) transfer/copy mechanisms.

FIG. 2 further shows that the method from the perspective of physical machine 105 can comprise an act 230 of sending the boot record(s) to the mounted virtual disk file. Act 230 includes sending a boot record for the one or more consistent snapshots to the mounted virtual hard disk file, such that the boot record for the one or more consistent snapshots can be modified at the virtual machine host. For example, FIG. 1B shows that conversion module 130 also sends boot data 120 to virtual hard disk file 140. FIG. 1C also shows that conversion module 130 can send message 165 to modify the boot record 120 to record 123, such that boot record 123 is consistent for the operating environment of virtual machine host 110. In one implementation, the new boot record for the new virtual machine can simply be created from scratch, rather than just sent and modified.

In addition to the foregoing, FIG. 2 shows that a method from the perspective of virtual machine host 110 of converting a machine (i.e., physical machine or prior virtual machine) to a virtual machine at a virtual machine host without incurring significant down time on the one or more machine volumes can comprise an act 240 of creating a virtual hard disk file. Act 240 includes creating a virtual hard disk file having a file size. For example, FIG. 1A shows that virtual machine host 110 receives message 150 instructing virtual machine host 110 to create a writable virtual hard disk file, as well as an instruction to make the new virtual hard disk file writable. In response, virtual machine host 110 creates virtual hard disk file 140 and makes it writable. As previously mentioned, herein, the virtual hard disk file size can be of either static or dynamic. For example, virtual hard disk file 140 might be set to 100 gigabytes in order to accommodate 50 gigabytes of volume 115 data. Alternatively, conversion module 130 sets virtual hard disk file 140 to grow dynamically with additional data transfers.

FIG. 2 also shows that the method from the perspective of virtual machine host 110 can comprise an act 250 of mounting the virtual hard disk file. Act 250 includes mounting the virtual hard disk file at a virtual machine host, such that the virtual hard disk file appears as an accessible physical disk. For example, FIG. 1A shows that virtual machine host 110 receives a request 155 to mount the virtual hard disk file 140. In one implementation, virtual machine host 110 might be instructed to associate file 140 with a particular device identifier, and then mount that identifier as a physical device. The virtual hard disk file 140 can then be viewed and accessed as a disk device 145.

In addition, the method from the perspective of virtual machine host 110 can comprise an act 260 of receiving one or more snapshots. Act 260 includes receiving data of one or more consistent snapshots corresponding to one or more physical machine volumes. For example, as shown in FIG. 1B, virtual machine host 110 receives volume data 127 and boot data 120 over using any appropriate transfer mechanism (i.e., whether byte-by-byte, or byte block-by-byte block, etc. on any network transfer protocol).

Furthermore, FIG. 2 shows that the method from the perspective of virtual machine host 110 can comprise an act 270 of modifying the boot record. Act 270 includes modifying operational information for the one or more consistent snapshots, such that the one or more consistent snapshots are appropriate for an operating system at the virtual machine host. As shown in FIG. 1C, for example, virtual machine host 110 receives message 165 to modify operational information. For example, message 165 can include one or more requests to identify appropriate virtual machine host 110 criteria, and changing boot data 120 to boot data 123 in an appropriate manner. Message 165 (or another message—not shown) can also include one or more requests to change registry and or operating preference information.

Such changes of an operational nature can include, for example, any number of hardware and operating system configurations (e.g., number of processors, hardware drivers, disk drivers/identifiers and storage drivers/identifiers, network drivers, etc.) Such changes may need to be considered to ensure that the new operating system of the virtual machine is compatible and functioning appropriately for the virtual environment. Changes of an operational nature can further include various registry manipulations, such as usage of drivers and other hardware, identity of drivers being replaced and/or registered in the binaries, updates to kernel and/or HAL information, and so forth. Changes of an operational nature can still further include various configuration preferences for the virtual machine, such as those for memory and/or CPU requirements.

In addition, FIG. 2 shows that the method from the perspective of virtual machine host 110 can comprise an act 280 of removing the virtual hard disk file mount. Act 280 includes removing the mount of the hard disk file, such that the virtual hard disk file is not accessible as a physical disk. For example, virtual machine host 110 receives message 170, which requests that virtual machine host 110 remove the mount of virtual hard disk file 140. Virtual machine host 110 can then un-mount the virtual hard disk file, such that file 140 is no longer accessible locally or over a network as a host-level disk drive. As a result, virtual disk file 140 can be booted as virtual machine 175, which contains data that are consistent for a single instance in time, and ready to operate at virtual machine host 110. In particular, and from the perspective of an end user, virtual machine 175 is—for virtually all intents and purposes—an essentially identical form (i.e., same data, or data subset(s) thereof) of physical machine 105 prior to snapshot operations.

Accordingly, FIGS. 1A-1C and 2 provide a number of components and mechanisms for efficiently converting a machine (e.g., a physical machine or prior virtual machine) to a virtual machine. In particular, the figures and corresponding text describe how implementations of the present invention can be accomplished in at least one respect without necessarily rebooting a machine being converted, and/or without necessarily needing to reboot into an ADS or PXE environment. As such, the foregoing components and mechanisms allow physical machines to be created relatively rapidly, such as at conventional disk and network transfer speeds.

As previously mentioned herein, one will appreciate that implementations of the present invention can be varied and modified for a wide range of optimizations, and wide range of hardware and operating system environments. For example, implementations of the present invention can be readily applied to conversion of any type of machine to a new virtual machine. With respect to a prior virtual machine, for example, a user might desire to create more storage space for a virtual machine whose volumes may already be maxed out. Accordingly, the user could create one or more VHD files that are larger than the previous VHD files of the previous virtual machine, snapshot the prior virtual machine data, and transfer the virtual machine snapshot data to the larger VHD files. Still further, the conversion processes described herein can be split further into multiple independent steps other than those explicitly described. For example, if a user has a way to transfer a volume image to a target machine, the user can simply invoke a fix-up operation to "virtualize" the image, or the like, so that the image is bootable at the target machine.

In addition to the foregoing, one will readily appreciate that implementations of the present invention can also be applied to a wide range of disk configurations. For example, the physical disk(s) on which machine volume 115 is/are installed might be any one or more of a basic or dynamic disk in an operating system, and can further have a variety of partitions and/or volumes. Nevertheless, the procedures, components, and mechanisms described herein can be applied to such variations in the virtual machine just as they were in the prior machine (e.g., physical machine or previous virtual machine). In particular, characteristics associated with a physical dynamic or basic disk can be transferred to the virtual machine host so that the new virtual machine will behave just as it did before with the basic or dynamic disk properties. Accordingly, the components, modules, and mechanisms described herein can be applied widely to ensure a seamless transition from a prior machine to a newly virtualized form of the prior machine.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a machine in a computerized environment that includes a virtual machine host configured to host one or more virtual machines, wherein the machine includes one or more volumes, a method of converting the machine to a virtual machine at the virtual machine host, comprising the acts of:
   identifying one or more hardware configuration settings for one or more volumes of a machine;
   creating one or more consistent snapshots corresponding to the one or more machine volumes, while the one or more machine volumes are active;
   sending the one or more consistent snapshots to a mounted virtual hard disk file; and
   sending a boot record for the one or more consistent snapshots to the mounted virtual hard disk file, such that the boot record for the one or more consistent snapshots can be modified at the virtual machine host to be made appropriate for an operating system at the virtual machine.

2. The method as recited in claim 1, wherein at least one of the one or more consistent snapshots is sent to the virtual machine host by transferring the at least one snapshot as a set of one or more byte blocks.

3. The method as recited in claim 1, wherein the machine is a physical machine, and the physical machine and the virtual machine host are the same computer system, such that the one or more volumes of the physical machine are transferred to a different disk device of the physical machine within the same computer system.

4. The method as recited in claim 1, wherein the one or more machine volumes comprise a plurality of machine volumes installed on a dynamic physical disk.

5. The method as recited in claim 1, wherein the act of creating the one or more consistent snapshots further comprises the acts of:
   identifying used space and free space on the one or more machine volumes;
   identifying one or more files in the used space to be avoided during snapshot or copy operations, the one or more files to be avoided including any one or more of a diff area file, a page file, a bad cluster, a hibernation file; and
   copying the data from the one or more machine volumes to one or more virtual hard disk files, such that the copied data include only one of:
   (i) the identified used space; or
   (ii) the identified used space without the one or more files to be avoided.

6. The method as recited in claim 1, wherein the act of identifying one or more hardware configuration settings further comprises the act of:
   identifying one or more applications on the one or more volumes that are configured for writer-involved snapshot processes; and
   sending an instruction to each identified application to begin writer-involved snapshot processes.

7. The method as recited in claim 6, further comprising the acts of:
   identifying one or more applications that are not configured for writer-involved snapshot processes; and
   shutting down each of the identified one or more applications that are not configured for writer-involved processes.

8. The method as recited in claim 1, further comprising the acts of:
   sending one or more instructions to the virtual machine host to create a virtual hard disk file; and
   sending an instruction to the virtual machine host to make the virtual hard disk file writable.

9. The method as recited in claim 8, wherein the virtual hard disk file is dynamically-sized, such that the size of the virtual hard disk file can change over time.

10. The method as recited in claim 8, further comprising the acts of:
   sending one or more instructions to mount the virtual hard disk file, thus creating said mounted virtual hard disk file; and
   identifying a device identifier for the mounted virtual hard disk file.

11. The method as recited in claim 10, further comprising an act of identifying one or more device identifiers for the one or more consistent snapshots.

12. The method as recited in claim 1, further comprising the acts of:
   identifying one or more system values of the virtual machine host; and
   sending an instruction to modify operational information for data of the one or more consistent snapshots in accordance with the identified one or more system values;
   wherein the instruction to modify operational information includes an instruction to modify any one or more of:
   (i) the boot record;
   (ii) system registry information;
   (iii) one or more drivers;
   (iv) operating system binaries;
   (v) kernel binaries; or
   (vi) one or more configuration preferences of the virtual machine.

13. The method as recited in claim 12, wherein the instruction to modify operational information includes any one or more of:
   one or more of instructions to replace drivers for one or more physical devices with drivers for one or more virtual devices;
   one or more of instructions to disable device drivers for hardware where there is no corresponding virtual device in the virtual environment; or
   one or more of instructions to disable one or more services that depend on one or more devices that do not exist at the virtual machine host.

14. The method as recited in claim 12, further comprising an act of sending one or more instructions to the virtual machine host to unmount the virtual hard disk file, such that the virtual hard disk file can be accessible as a virtual machine but not as a physical disk.

15. At a virtual machine host in a computerized environment, wherein the virtual machine host is configured to host one or more virtual machines that include one or more volumes, a method of converting a physical machine to a virtual machine at the virtual machine host, comprising the acts of:
   creating a virtual hard disk file having a file size;
   mounting the virtual hard disk file at a virtual machine host, such that the virtual hard disk file appears as an accessible physical disk;
   receiving one or more consistent snapshots corresponding to one or more physical machine volumes, wherein the snapshots are made while the physical machine volumes are active;
   modifying operational information corresponding to a boot record and a registry setting in the one or more consistent snapshots, such that the one or more consistent snapshots are appropriate for booting an operating system at the virtual machine host; and
   unmounting the virtual hard disk file, such that the virtual hard disk file is not accessible as a physical disk.

16. The method as recited in claim 15, further comprising an act of saving the one or more consistent snapshots in the virtual hard disk file.

17. The method as recited in claim 15, further comprising an act of receiving data for the one or more consistent snapshots on a byte block level.

18. The method as recited in claim 15, further comprising the acts of:
   receiving an instruction to make the created virtual hard disk file writable; and
   sending a device identifier for the mounted virtual hard disk file to a physical computer system.

19. The method as recited in claim 15, further comprising an act of reporting one or more system values to the physical machine, wherein the one or more system values are used to modify the operational information for the one or more consistent snapshots.

20. At a machine in a computerized environment that includes a virtual machine host configured to host one or more virtual machines, wherein the machine includes one or more volumes, a computer program product having computer-executable code stored thereon that, when executed, cause one or more processors at the machine to perform a method of converting the machine to a virtual machine at the virtual machine host, comprising the acts of: identifying one or more hardware configuration settings for one or more volumes of a machine;
   creating one or more consistent snapshots corresponding to the one or more machine volumes, while the one or more machine volumes are active;
   sending the one or more consistent snapshots to a mounted virtual hard disk file; and
   sending a boot record for the one or more consistent snapshots to the mounted virtual hard disk file, such that the boot record for the one or more consistent snapshots can be modified at the virtual machine host.

* * * * *